& Alex

United States Patent [19]

Rousseau

[11] 4,094,042

[45] June 13, 1978

[54] METHOD FOR REMOVING MEAT FROM BONE FRAGMENTS

[75] Inventor: Roy Settle Rousseau, Bettendorf, IA

[73] Assignee: The Kartridg Pak Co., Davenport, Iowa

[21] Appl. No.: 732,766

[22] Filed: Oct. 15, 1976

Related U.S. Application Data

[62] Division of Ser. No. 505,977, Sep. 3, 1974, Pat. No. 4,025,985.

[51] Int. Cl.² ............................................. A22C 17/00
[52] U.S. Cl. ............................................ 17/46; 17/1 G
[58] Field of Search ............... 17/1 G, 46; 100/37, 100/116, DIG. 10; 99/513, 537, 538; 123/188 A

[56] References Cited

U.S. PATENT DOCUMENTS

| 2,109,559 | 3/1938 | Wickart, Jr. ............... | 100/116 X |
| 2,331,126 | 10/1943 | Loomis ....................... | 100/116 X |
| 2,398,135 | 4/1946 | De La Rosa, Sr. .......... | 100/116 X |
| 2,932,058 | 4/1960 | Childers ..................... | 17/1 G |
| 3,266,542 | 8/1966 | Paoli ........................... | 17/1 G |
| 3,498,621 | 3/1970 | Wilson ........................ | 123/189 A |
| 3,659,638 | 5/1972 | Paoli ........................... | 17/1 G |
| 3,841,569 | 10/1974 | Engelhardt ................. | 17/46 X |
| 4,014,075 | 3/1977 | van Bergen ................. | 17/1 G |

FOREIGN PATENT DOCUMENTS

1,066,902   10/1959   Germany ................. 17/1 G

Primary Examiner—Louis G. Mancene
Assistant Examiner—Paul J. Hirsch
Attorney, Agent, or Firm—Lockwood, Dewey, Zickert & Alex

[57] ABSTRACT

Apparatus for removing and recovering meat from trimmed and untrimmed bone fragments comprises a hollow sleeve open at one end for receiving a quantity of bone fragments to be processed. Hydraulic cylinders raise the sleeve to bring one end into engagement with an extrusion block, and a piston slidably disposed at the other end of the sleeve is advanced initially by relatively high speed jack cylinders and finally by a low speed ram cylinder to compress the bone fragments against the block. The extrusion block includes a plurality of concentric annular recesses and interfitting extrusion rings which form an inwardly facing foraminous surface through which meat recovered in fluid form as a result of the compression process passes. The rings are slidably received within the recesses to facilitate removal for cleaning, and are partially extended from the recesses by a pneumatic cylinder after each compression cycle to dislodge bone residue from the foraminous surface. A pressure and seal is maintained between the sleeve and the piston and extrusion head by the combination of an O-ring fitted into an outer circumferential channel on the piston and an inner circumferential channel communicating with an outflow line which relieves pressure from the O-ring.

5 Claims, 23 Drawing Figures

U.S. Patent June 13, 1978 4,094,042
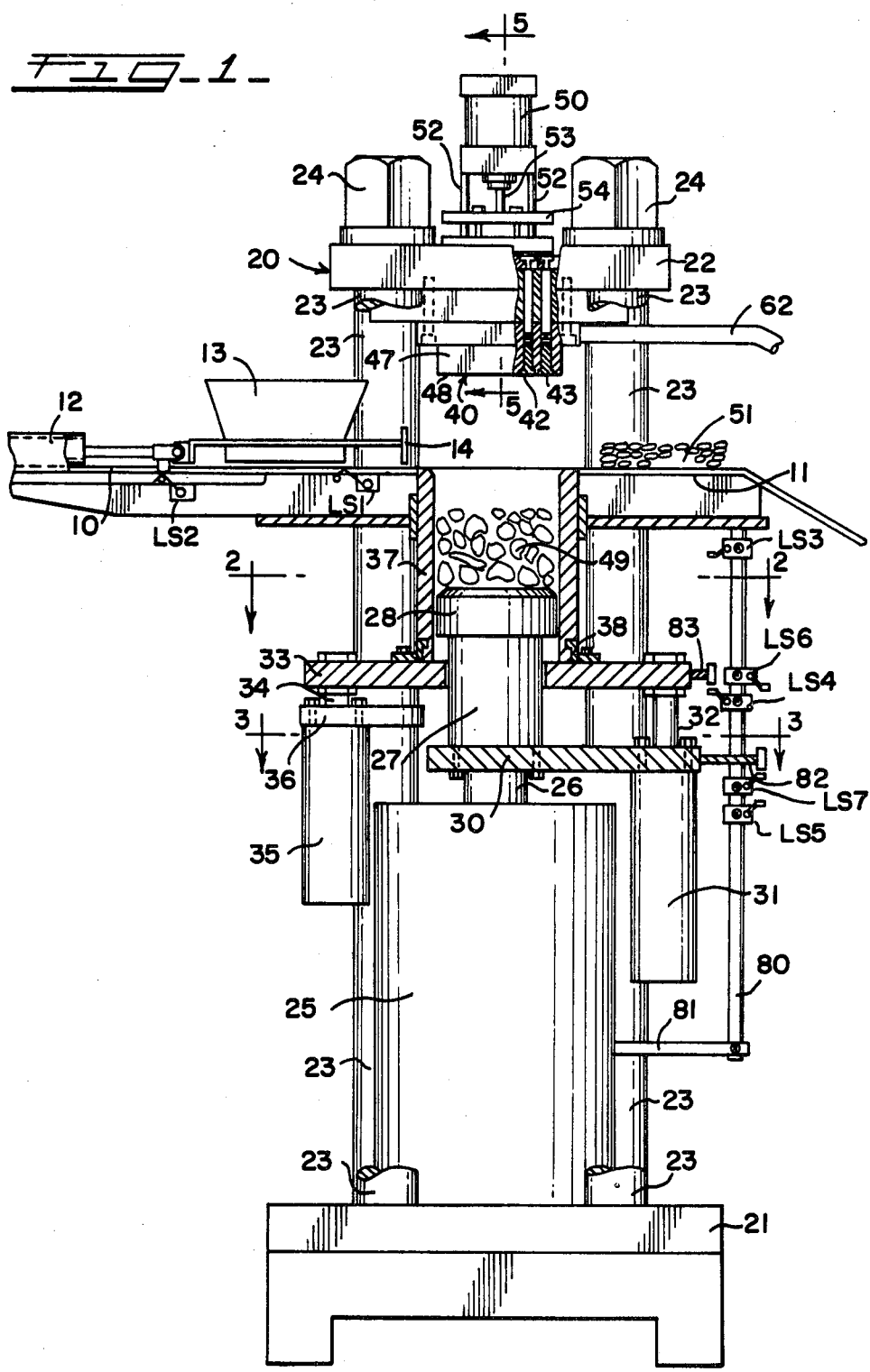
Fig-1-

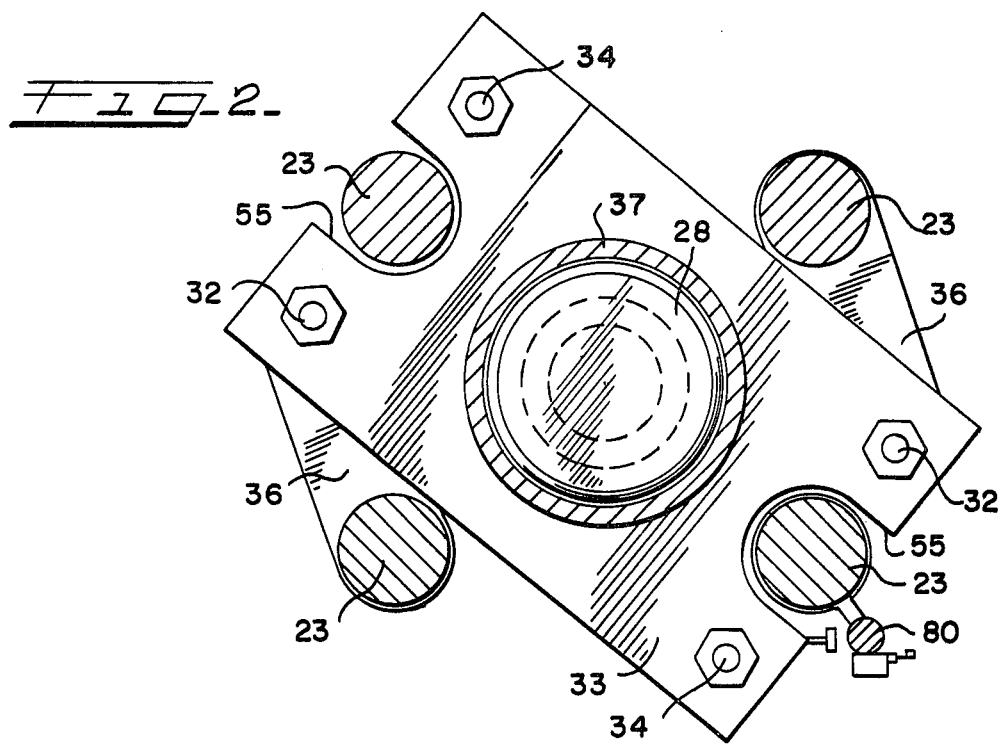
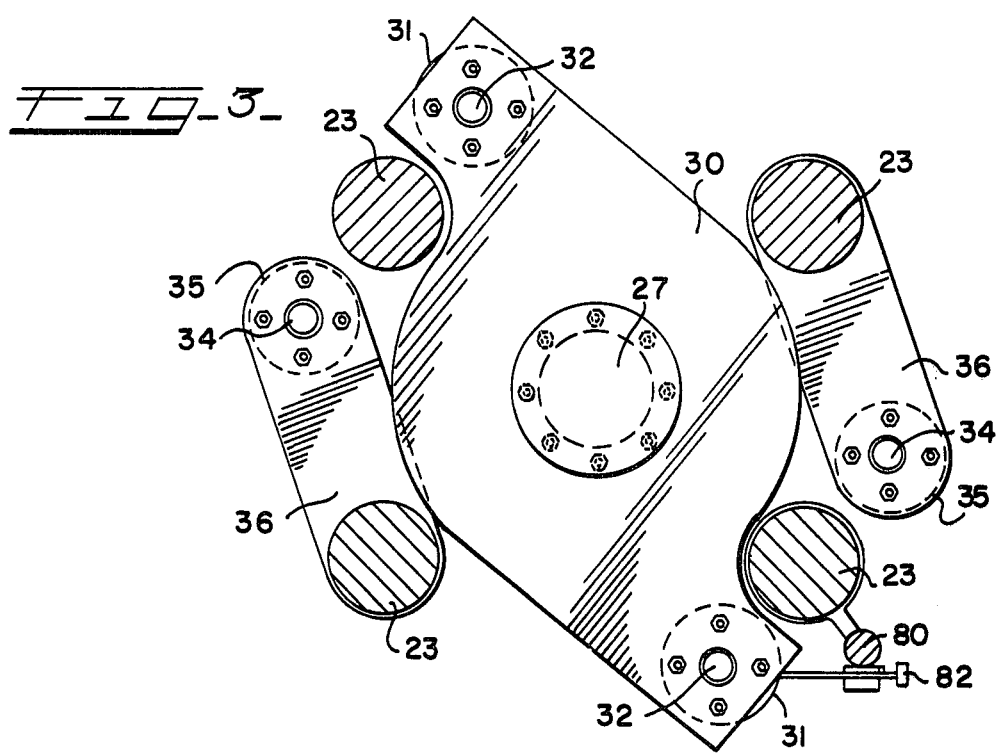

FIG-4-
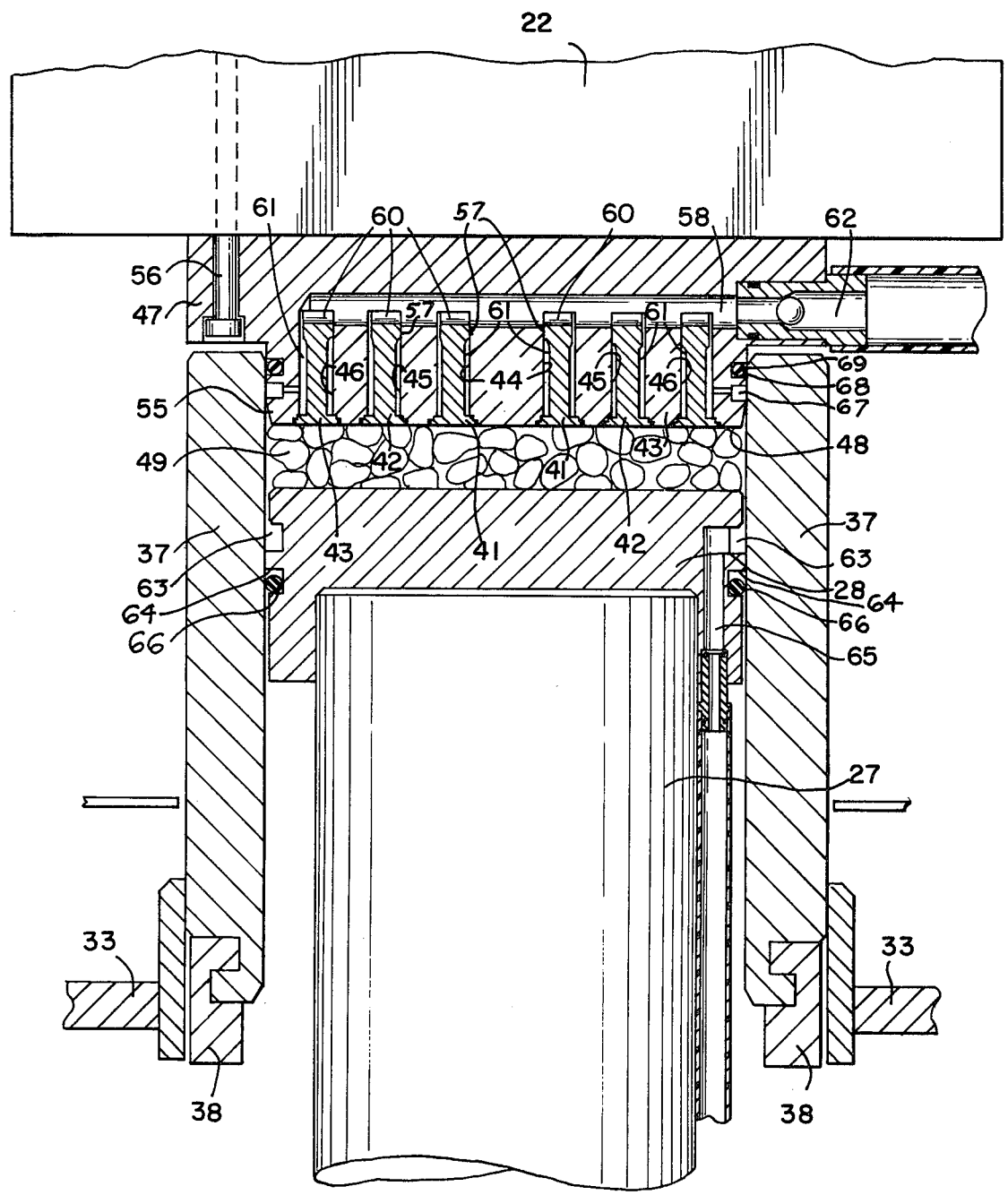

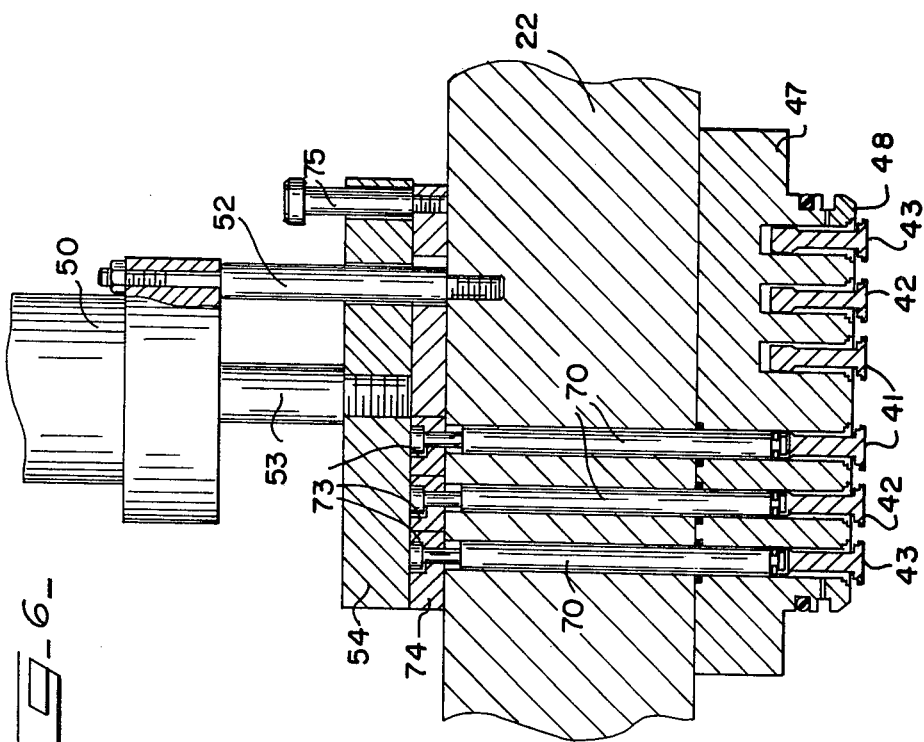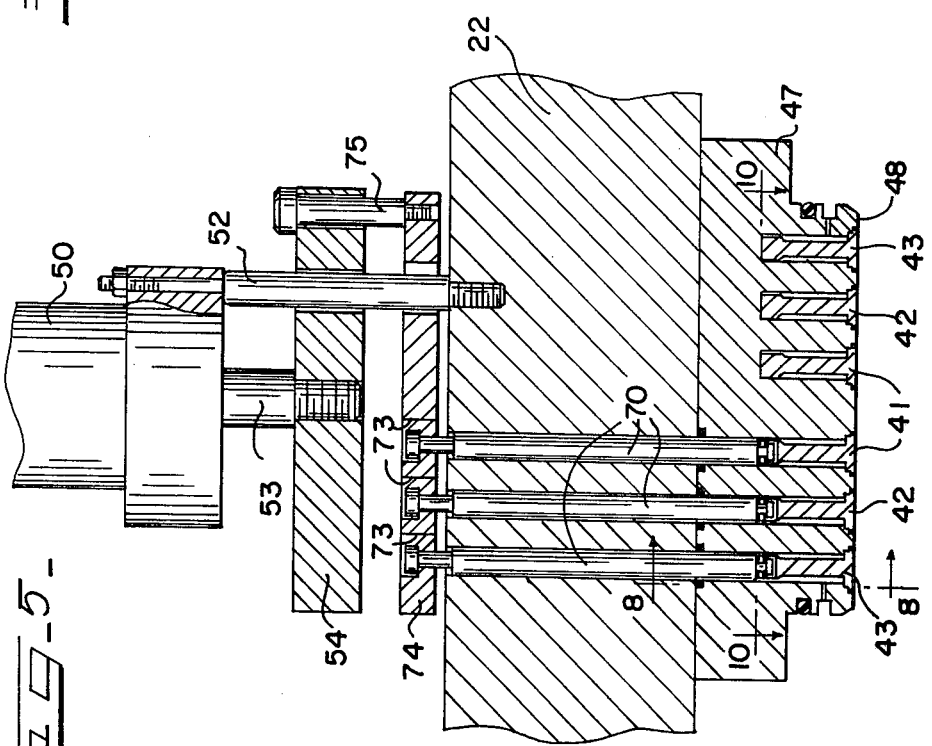

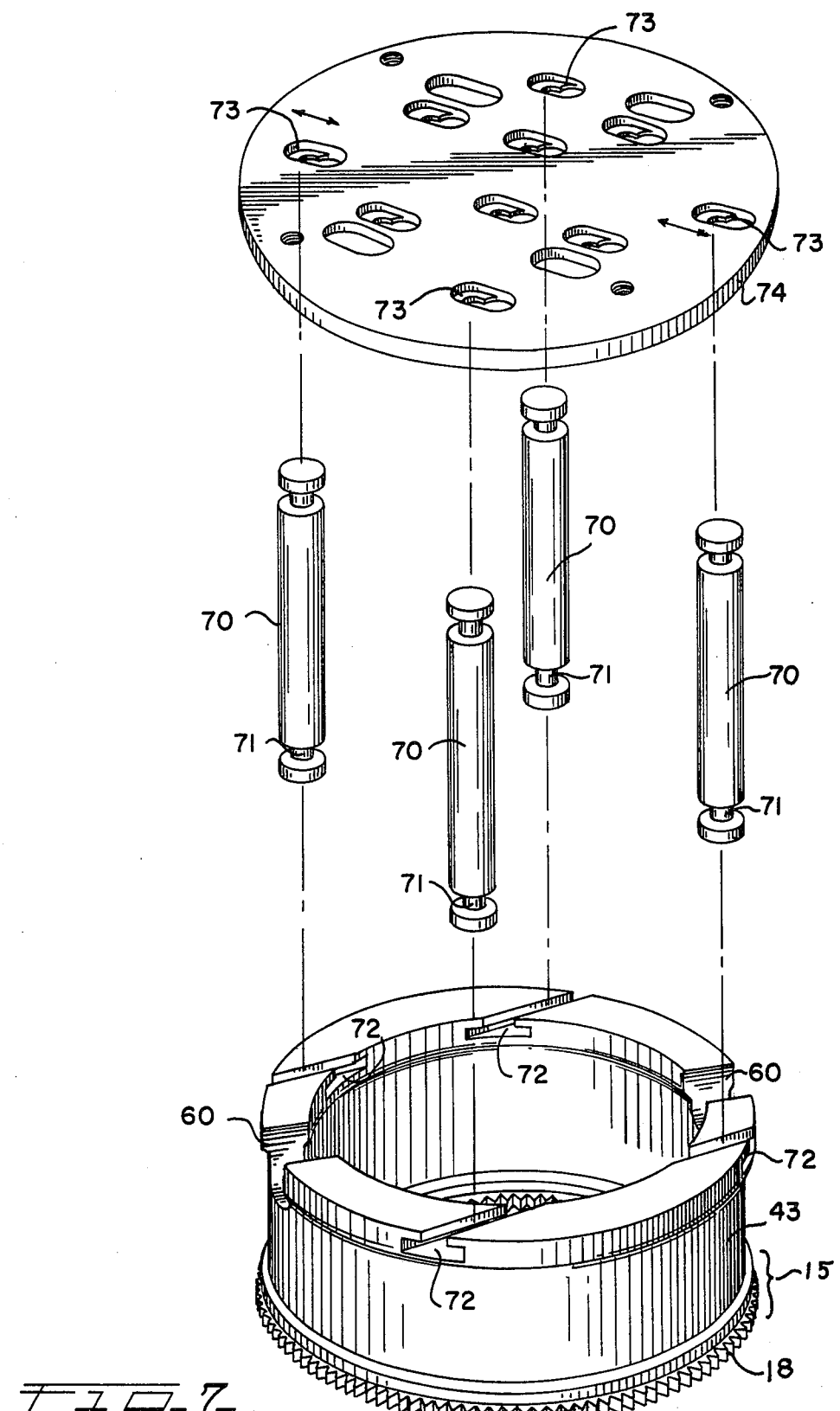

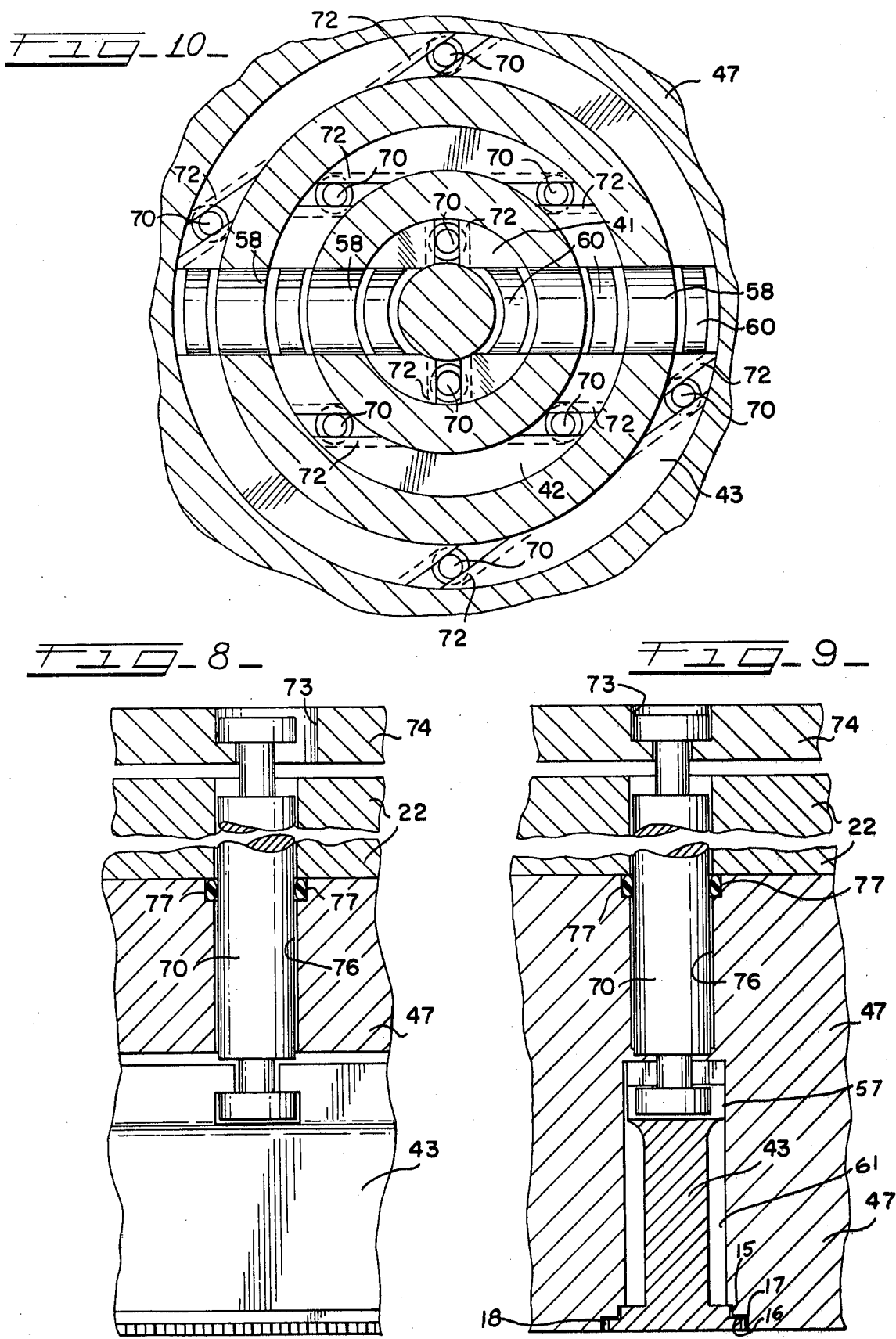

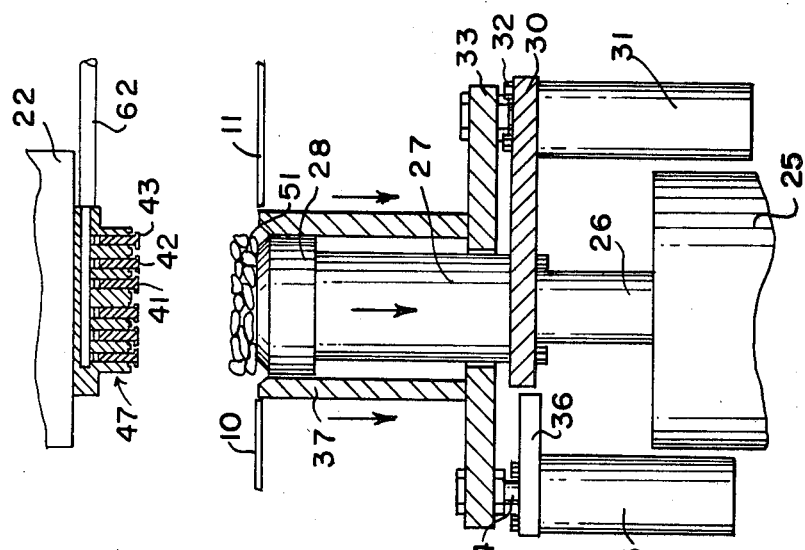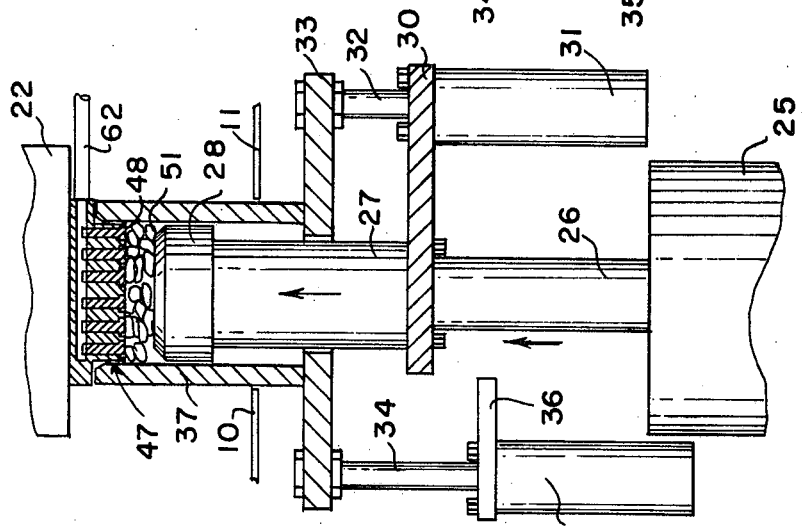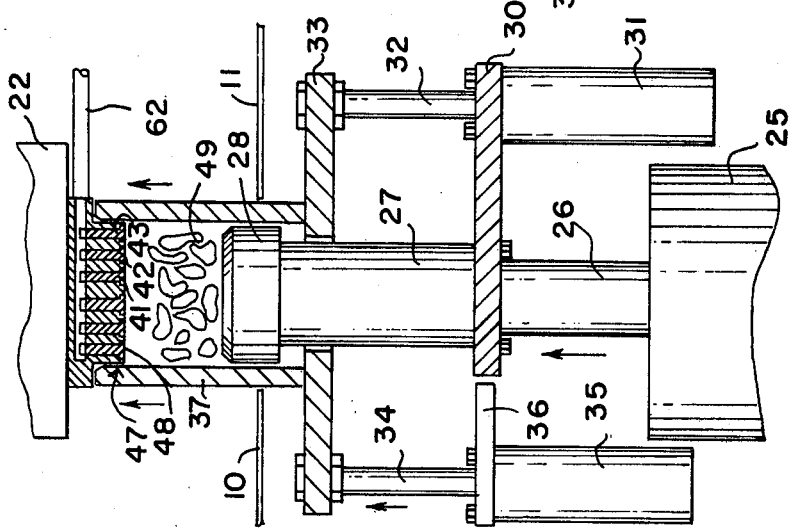

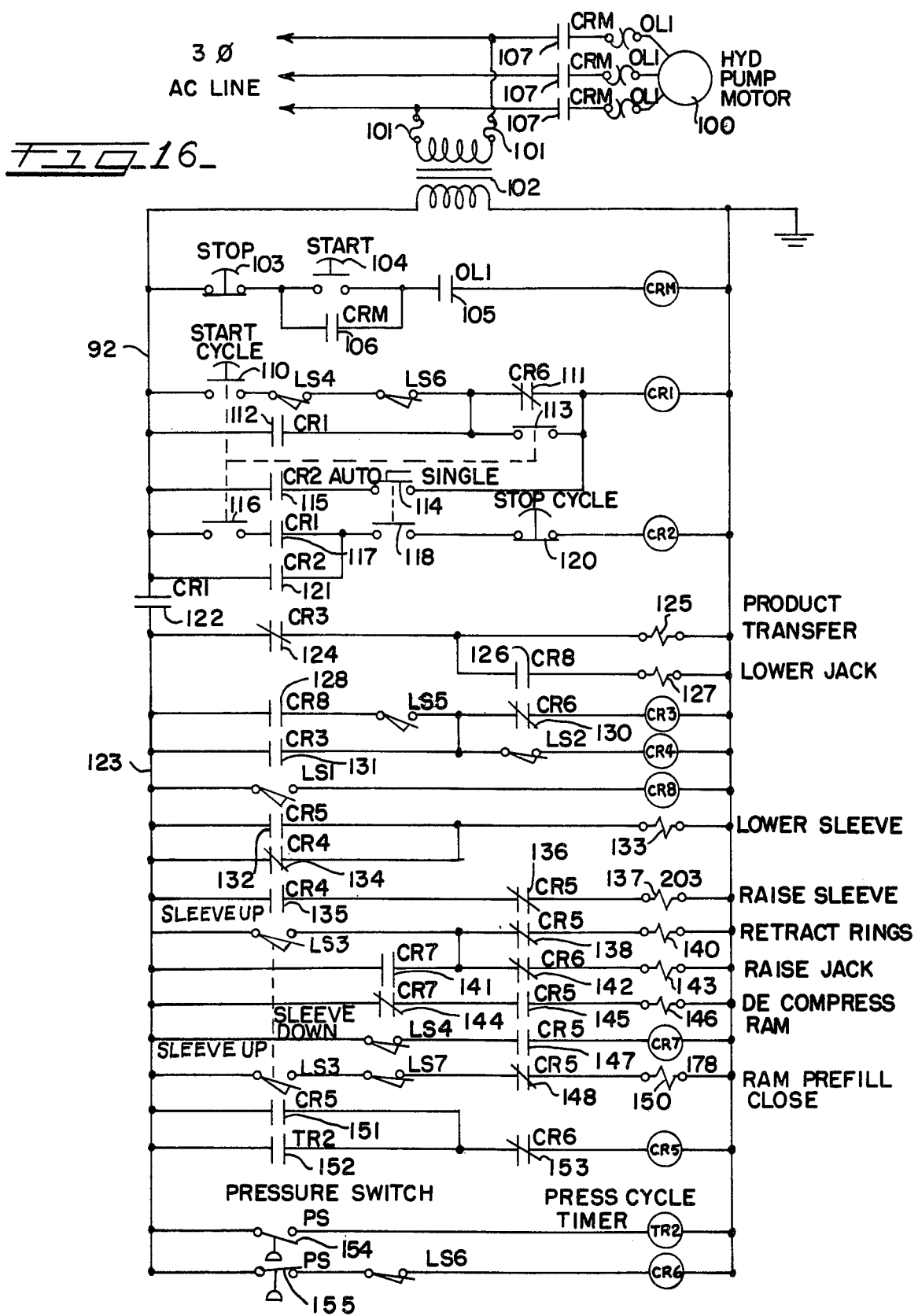

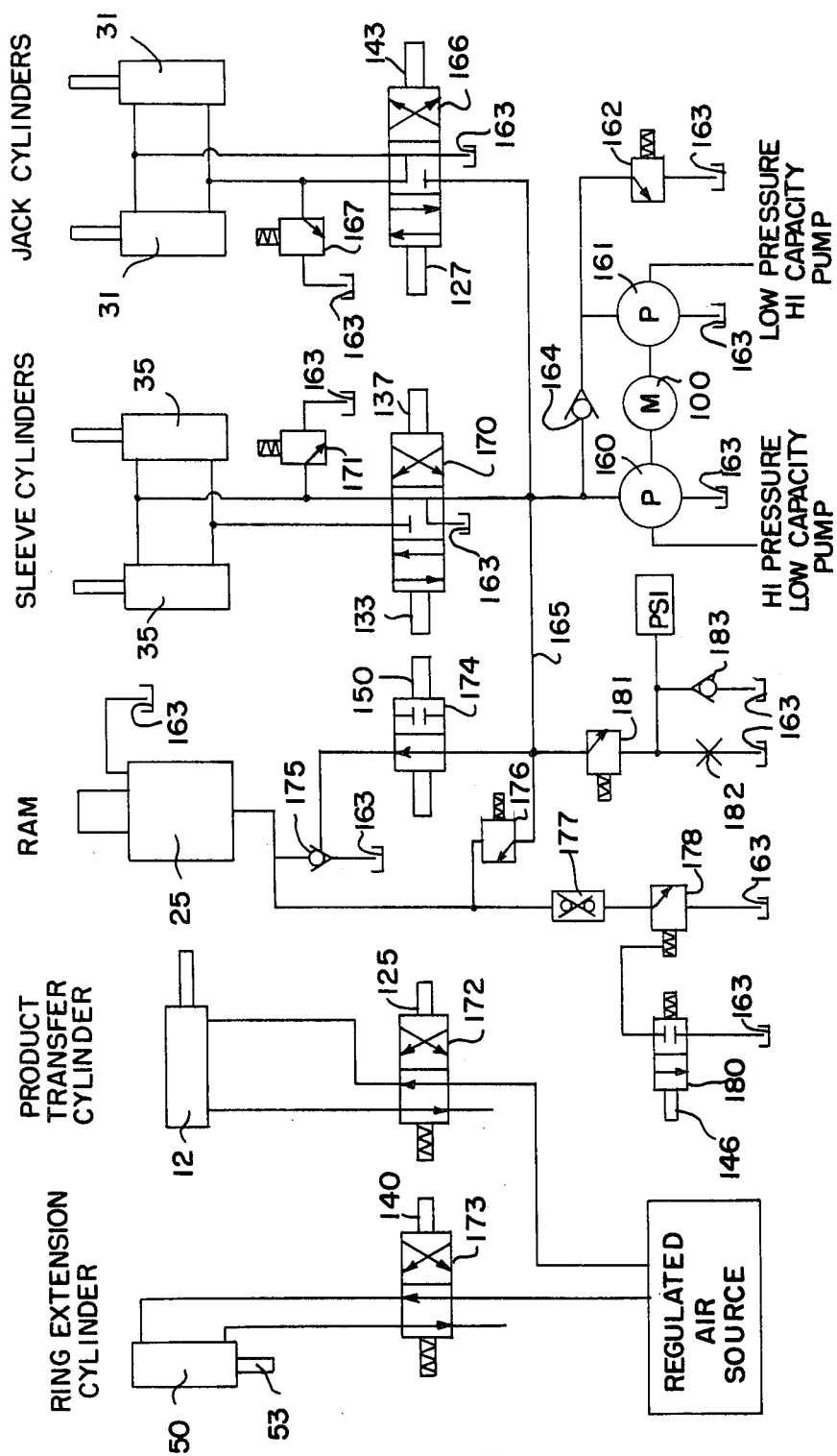

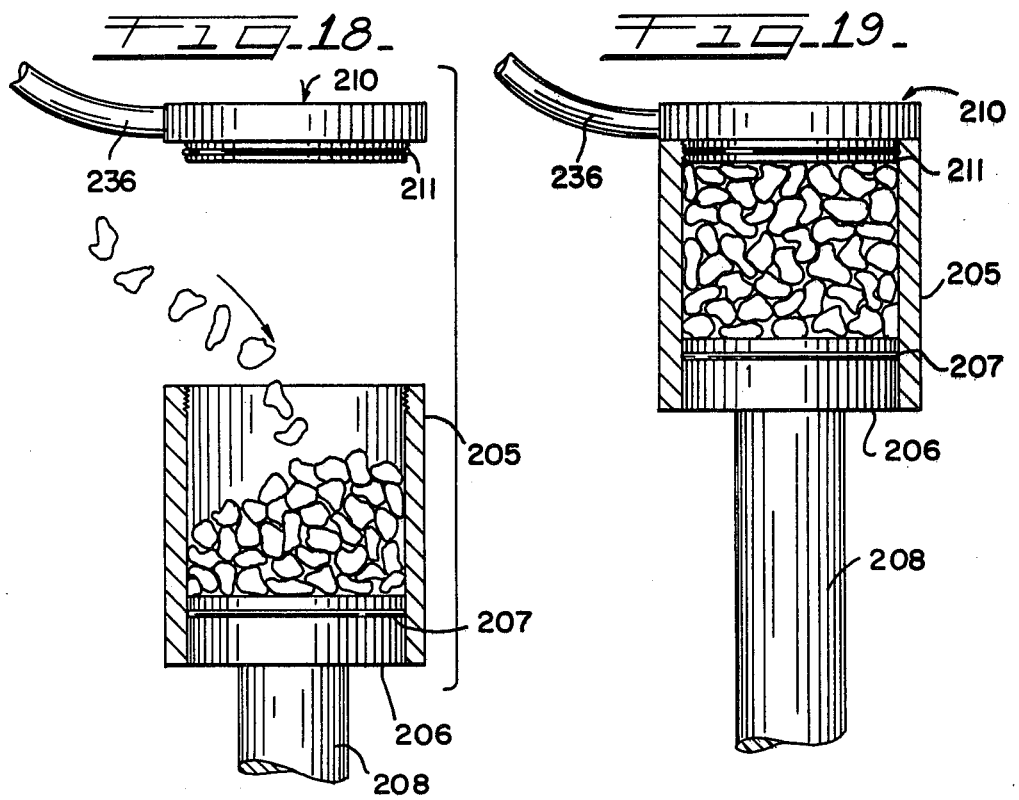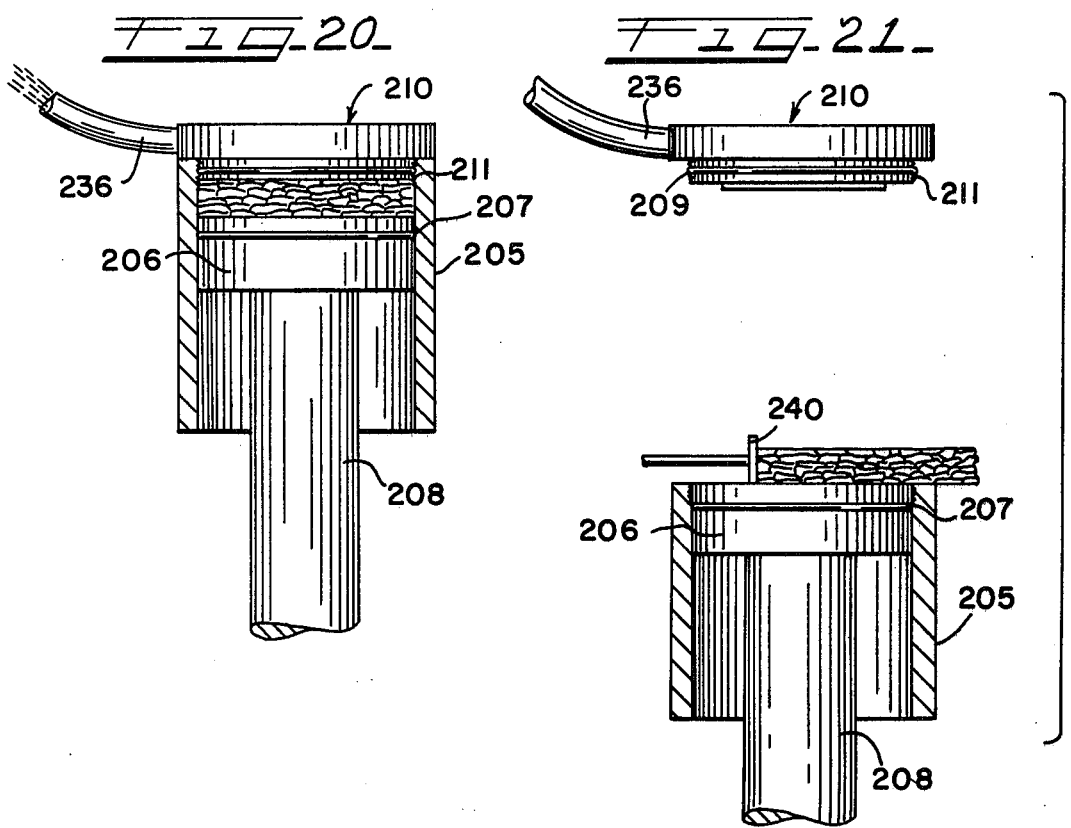

METHOD FOR REMOVING MEAT FROM BONE FRAGMENTS

This application is a division of my prior application, Ser. No. 505,977, filed Sept. 3, 1974, now U.S. Pat. No. 4,025,985 dated May 31, 1977.

The present invention relates generally to apparatus for removing and recovering meat from bones, and more particularly to an improved demeating apparatus which provides increased yield without substantially or objectionably increasing the calcium content of the removed and recovered meat.

Trimmed and untrimmed bone fragments, a by-product of conventional slaughtering and carcass processing operations, may comprise up to forty percent (by weight) meat, depending on the particular type of bone fragment and how carefully the bone fragment has been trimmed. While these bone fragments constitute a potentially low-cost source of undenatured meat for use in sausages, meat loaf products, and the like, the high cost of labor has made it uneconomical to remove this meat from the bone fragments by conventional hand trimming methods.

Various techniques and apparatus have been developed for automatically demeating bone fragments, but these have not been adequately successful for one reason or another, including the introduction of excessive calcium from the bones into the recovered meat. Accordingly, the need has developed for an automatic demeating apparatus which will efficiently remove meat from bone segments without appreciably increasing the calcium content of the recovered meat.

One method for demeating bone fragments which has proven particularly successful is described in the co-pending application of John N. Engelhardt and Roy S. Rousseau, Ser. No. 307,959, filed Nov. 20, 1972, now U.S. Pat. No. 3,841,569 and assigned to the present assignee. Basically, this method contemplates the use of a compression chamber formed from a cylindrical sleeve and equipped with a piston at one end and a foraminous wall on the opposite end. The bone fragments with meat attached, which may be either trimmed or untrimmed depending on the type of bone fragments and the labor involved in trimming, are loaded into the chamber and the piston is advanced to progressively reduce the volume of the chamber. This compresses the bone segments against the foraminous wall, causing meat to separate and extrude through the foramina leaving essentially only compacted bone fragments in the form of a dense relatively incompressible press cake within the chamber.

The need has developed in commercial carcass processing operations for apparatus capable of performing demeating operations in accordance with the above method with maximum efficiency and ease of operation. Preferably, such apparatus will avoid moving the bone fragments while the bone fragments are in contact with the foraminous surface since such movement or mechanical working of the fragments results in bone material being separated from the fragments and appearing in the recovered meat as excess calcium. Furthermore, it is desirable that the individual foramina employed in the foraminous wall of the apparatus be easily accessible and removable to facilitate the frequent and thorough cleaning of the apparatus required in commercial operations.

Accordingly, the object of the present invention, generally stated, is the provision of new and improved demeating apparatus for economically and efficiently removing and recovering a substantial portion of the residual meat from trimmed and untrimmed bone fragments.

It is a more specific object of the present invention to provide new and improved apparatus for removing and recovering from trimmed and untrimmed bone fragments residual meat in the form of a fluidized meat mass.

It is another object of the present invention to provide new and improved apparatus for removing and recovering residual meat from trimmed and untrimmed bone fragments which does not substantially or objectionably increase the calcium content of the recovered meat.

It is another object of the present invention to provide new and improved apparatus for removing and recovering residual meat from trimmed and untrimmed bone fragments which can be easily cleaned and serviced.

It is another object of the present invention to provide a faster and more efficient apparatus for removing and recovering residual meat from trimmed and untrimmed bone fragments.

SUMMARY OF THE INVENTION

The invention is directed to apparauus for removing and recovering meat from bone fragments. The apparatus comprises means including a hollow sleeve for receiving a quantity of bone fragments having meat portions attached thereto for processing, and an extrusion block disposed at one end of the sleeve, the block having an inwardly-facing surface including at least one recess, and a connecting passageway extending from the recess through the block, and means including an extrusion member interfitting with the recess and having an inwardly-facing surface for forming in conjunction with the inwardly-facing surface of the recess, a foraminous surface for allowing only recovered meat in fluid form to pass through the passageway. A piston is disposed at the other end of the sleeve and mounted for reciprocation along the axis of the sleeve, the piston defining in conjunction with the sleeve and the extrusion block a compression chamber for the bone fragments, and means are provided for moving the piston along the axis of the sleeve to reduce the volume of the compression chamber to compress the bone fragments against the foraminous surface whereby at least a substantial portion of the meat on the bone fragments is extruded through the passageway.

The invention is further directed to apparatus for removing and recovering meat from bone fragments which comprises a vertically aligned open-ended sleeve, the sleeve being mounted for reciprocation along a defined operating path and having a predetermined home position, and an extrusion head disposed above the open end of the sleeve and including a foraminous surface axially aligned therewith and dimensioned to be received therein. A piston is arranged to reciprocate along the axis of the sleeve, the piston forming, when positioned at the bottom of the sleeve, a chamber within the sleeve for receiving bone fragments to be processed, and means are provided for loading bone fragments to be processed into the chamber through the open end. Means are provided for moving the sleeve along its operating path to bring the open end into sealing engagement with the foraminous surface, and compression means for moving the piston along the axis of the enclosure are provided to compress the bone fragments and recover meat therefrom by extrusion through the foraminous surface.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in connection with the accompanying drawings, in the several figures of which like reference numbers identify like elements, and in which:

FIG. 1 is a front elevational view, partially in section, of a demeating apparatus constructed in accordance with the present invention.

FIG. 2 is a cross-sectional view of the demeating apparatus taken along lines 2—2 of FIG. 1.

FIG. 3 is a cross-sectional view of the demeating apparatus taken along the lines 3—3 of FIG. 1.

FIG. 4 is an enlarged front elevational view, partially in cross section, showing the compression chamber of the apparatus with demeating bone fragments illustrated in a compressed condition.

FIG. 5 is an enlarged cross-sectional view taken along lines 5—5 of FIG. 1 showing the extrusion head of the demeating apparatus with the extrusion rings in their seated position.

FIG. 6 is an enlarged cross-sectional view corresponding to the cross-sectional view of FIG. 5 with the extrusion rings shown in their extended position.

FIG. 7 is an enlarged exploded view showing the extrusion ring, support rods and support plate utilized in the extrusion head of the demeating apparatus.

FIG. 8 is an enlarged cross-sectional view taken along lines 8—8 of FIG. 5.

FIG. 9 is a cross-sectional view taken along lines 9—9 of FIG. 8.

FIG. 10 is a fragmentary cross-sectional view taken along lines 10—10 of FIG. 5 showing the extrusion rings and their support rods.

FIG. 13 is a front elevational view, partially in cross section, of the compression chamber and extrusion head in a third portion of the demeating cycle.

FIG. 14 is a front elevational view, partially in cross section, of the compression chamber and extrusion head in a fourth portion of the demeating cycle.

FIG. 15 is a front elevational view, partially in cross section, of the compression chamber and extrusion head in a fifth portion of the demeating cycle.

FIG. 16 is a simplified schematic diagram of the electrical circuitry of the apparatus in FIG. 1.

FIG. 17 is a simplified diagram of the hydraulic and pneumatic systems of the demeating apparatus of FIG. 1.

FIGS. 18–21 constitute a series of partially diagrammatic views showing an alternate construction for the compression chamber.

To separate the fluidized meat from the bone fragments during the compression cycle the demeating apparatus 20 includes an extrusion head 40 bolted to the underside of top plate 22. Referring to FIG.4, this extrusion head, which is coaxial with sleeve 37 and compression piston 28, comprises three extrusion rings 41-43 of progressively increasing diameter slidably received within complementarily dimensioned annular recesses or channels 44-46 within an extrusion block 47. As will be seen presently, the extrusion rings 41-43 and the under surface of the extrusion block 47 together present a foraminous surface 48 to bone fragments 49 undergoing compression within the chamber formed within sleeve 37 to accomplish the desired separation of fluidized meat from the bone fragments.

As shown in FIG. 1, the extrusion head 40 also includes a pneumatic ring extension cylinder 50 for extending the extrusion rings from extrusion block 47. Actuation of cylinder 50, which results in an abrupt downward movement of the three extrusion rings, separates the bone residue press cake 51 formed within the compression chamber from foraminous surface 48 following completion of the compression portion of the demeating cycle. The ring extension cylinder 50 is mounted above top plate 22 by means of a pair of support rods 52 and includes a piston rod 53 which is attached to a striker plate 54 at its bottom end.

Figure 11:
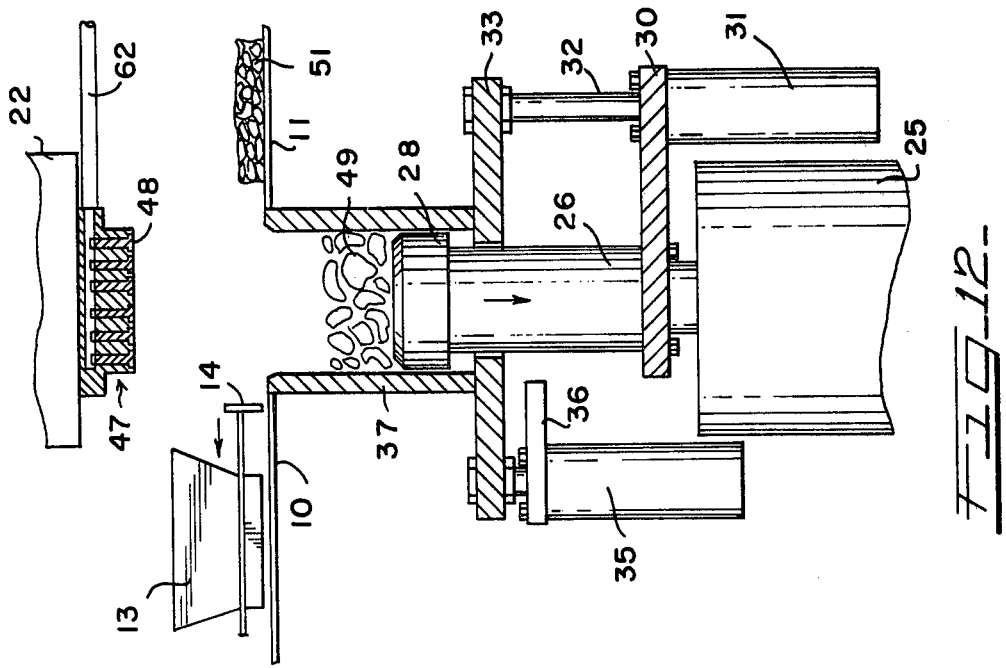
FIG. 11 is an elevational view, partially in cross section, of the compression chamber and extrusion head in a first portion of the demeating cycle.

To facilitate loading bone fragments into the compression chamber demeater 20 is provided with infeed and outfeed aprons 10 and 11, respectively. Infeed apron 10 supports a pneumatic feed cylinder 12 and an infeed hopper 13, the latter having no bottom so that bone fragments carried therein drop therefrom into the chamber formed by sleeve 37 and piston 28 when the hopper is aligned over the sleeve. It is the purpose of pneumatic cylinder 12 to move hopper 13 into this position at the beginning of each demeating cycle. Hopper 13 is also provided with a horizontally extending push member 14 for clearing the residue bone cake 51 from the immediately preceding demeating cycle away from the compression chamber and onto outfeed apron 11.

As shown in FIG. 2, sleeve plate 33 is rectangular and includes at either end a notch which provides clearance for support posts 23 of the apparatus frame. The piston rods 32 of jack cylinders 31 are attached at opposite corners to plate 33, and the piston rods 34 of sleeve cylinders 35 are attached to the remaining corners As shown in FIG. 3 jack plate 30 is shaped to provide clearance for support posts 23, hydraulic cylinders 35 and piston rods 34. The piston rods 32 of jack cylinders 31 attach at opposite ends of plate 30 so as to exert a balanced force on the jack plate.

Extrusion head 40 is shown in greater detail in FIGS. 4-6. Referring to FIG. 4, during the compression portion of the demeating cycle the three extrusion rings 41-43 are seated within respective ones of the three ring-shaped channels 44-46 and the cylindrical sleeve 37 is engaged with an annular flange portion 55 on block 47 to form the compression chamber. The annular rings are maintained in precise alignment within their respective channels by means of annular pilot flange portions 57 provided on the inside top margins of the rings which bear against the inside surfaces of the respective channels. Similar pilot flanges may also be provided on the outside top margins to bear against the outside surfaces of the channels, if necessary. The extrusion block 47 is attached to top plate 22 by fastening means in the form of a plurality of bolts 56 which pass through extrusion block 47 and into threaded engagement with top plate 22.

The radial width of each of the extrusion rings for at least the greater portion of their axial length is appreciably less than the radial width of their corresponding annular recesses 44-46, so that side clearances 61 are provided on each side of the rings as indicated in FIGS. 4-6. These side clearances, which may be in the order of 0.0625 inches, appreciably greater than the clearances at the outwardly stepped entrances to the recesses, form passageways for conveying the recovered meat from the foraminous surface 48.

Extrusion block 47 is provided with a diagonal passageway 58 for conveying away fluidized meat recovered through channels 44-46 during the compression cycle. This passageway extends across block 47 between the top portions of channels 44-46 and connects with a flexible outflow conduit 62 which carries the recovered meat to a central storage location. A check valve 59 is preferably provided in conduit 62 to prevent back flow following the compression portion of the cycle. To establish communication between side clearances 61 and passageway 58 and to avoid interfering with the flow of recovered meat through the passageway each of the extrusion rings 41-43 is provided with a pair of diametrically opposed notches 60 along its top margin. These notches extend downwardly beyond the annular pilot portions at the top margins to establish communication between passageway 58 and passageways 61.

Referring to FIGS. 8 and 9, the three extrusion rings are each stepped outwardly at their bottom edges to form a terraced flange portion 15. The margins of the three ring receiving channels are similarly stepped to form a complementarily terraced recess portion 16 for receiving the flange portions, a slight spacing being provided between the terraced portions. In accordance with one aspect of the invention, this spacing forms a labrynth-like passageway 17 through which the liquified meat product removed from the bone fragments must pass. By reason of the right angles established by the steps in this passageway bone splinters, which might otherwise be forced under pressure into passageway 61, are trapped against a flat wall surface of either the extrusion block or the extrusion ring. As a further protection against bone splinters escaping the outer edges 18 of the lowermost steps are provided with a knurled surface consisting of a plurality of sawtooth-like teeth axially aligned with respect to the extrusion ring. These prevent bone splinters from lying sideways in passageway 17 and passing while thus orientated around the corners formed between the steps. Typically, the edges of the individual teeth may be spaced 0.005 inches from the adjacent surface of the extrusion block, and the notches between the teeth may be spaced 0.030 inches from the block. The radially aligned portion of passageway 17, which comprises the narrowest portion of the passageway, is typically 0.023 inches wide.

The fluidized meat product derived in the compression process is also recovered between the annular flange portion 55 of extrusion block 47 and the inside surface of sleeve 37 by means of a pair of annular channels 67 and 68 disposed on the flange portion of the extrusion block. The upper channel 67 contains an O-ring 69 for sealing the compression chamber. The lower channel 68 is connected by a plurality of radial passageways 69 to the passageway 61 formed by extrusion ring 43 so that any fluidized meat product entering this channel is conveyed to passageway 58 and the central storage location. Passageway 68, in addition to collecting recovered meat product, serves to relieve the pressure on O-ring 69, which would otherwise be so great as to cause premature failure of the O-ring. In practice the O-ring may be designed to withstand a pressure of 1500 PSI, whereas the pressure developed in the compression chamber may reach 12,000 PSI.

Similarly, a pair of annular channels 63 and 64 are provided around the outside surface of compression cylinder 28 to collect recovered meat product developed around the piston. Channel 63 connects with an axially aligned discharge passageway 65 which in turn is connected by a flexible conduit to the central storage location. An O-ring 66 is provided in channel 64 to seal the compression chamber, and channel 63 serves to prevent this seal from being exposed to excessive pressure. A check valve (not shown) may be provided in the flexible conduit to prevent reverse flow of the recovered meat product into the compression chamber following the compression portion of the demeating cycle.

Referring to FIGS. 5-7, demeating apparatus 20 includes a plurality of push rods 70 for holding the extrusion rings 41-43 in their respective annular channels in extrusion block 47.

As shown in FIG. 10, the inner extrusion ring 41 has two push rods 70 associated with it, the middle ring 42 has four such push rods, and the outer ring 43 also has four push rods. These push rods are equally spaced about the circumferences of the extrusion rings so as to exert a balanced force on the rings. The ten push rods 70 perform the dual functions of retaining the extrusion rings in position and of pushing the rings partially out of their channels following the compression portion of the demeating cycle to prevent press cake 51 from sticking to foraminous surface 48. The push rods each include annular notched portions 71 at their bottom ends which are slidably received within T-shaped slots 72 provided at spaced locations along the top surfaces of the extrusion rings, as shown in FIGS. 8 and 9. Preferably, the slots on any one ring are all aligned in the same direction, as shown in FIGS. 7 and 10 to allow each ring to be detached from its push rods by sliding it in one direction.

The top ends of the push rods 70 are received within elongated slots 73 on a push rod retainer plate 74 above top plate 22. Slots 73 are elongated and enlarged at one end so that by shifting the position of the retainer plate 74 to one side (to the left in FIGS. 5-7) each of the push rods can be withdrawn. This is a significant advantage since once the top ends of the push rods are thus released the extrusion rings supported by these push rods can be pulled down clear of their channels and disconnected from the push rods for cleaning without disrupting the alignment of the extrusion head 40.

In FIG. 5 the extrusion rings are shown retracted by reason of the push rod retaining plate 74, and hence push rods 70, having been lifted upwardly away from top plate 22 by the retracted ring extension cylinder 50. This condition exists because piston rod 53 and striker plate 54 are connected to retaining plate 74 by guide pins 75 (only one shown in FIGS. 5 and 6) so that when cylinder 50 is retracted the retaining plate 74 is lifted.

Referring to FIG. 6, to free the press cake from foraminous surface 48 the pneumatic ring extension cylinder 50 is momentarily actuated to bring striker plate 54 into contact with the top ends of push rods 70. This displaces the push rods and extends extrusion rings 41–43 as shown in FIG. 6. As a result of this slight displacement of rings 41–43 press cake 51 (FIG. 1) is freed from the foraminous surface 48, allowing it to be pushed aside by push member 14 during the next operation of infeed hopper 13. In practice the extension of the extrusion rings takes place very rapidly, since cylinder 50, being pneumatic extends rapidly to impart a sharp hammer-like blow to the push rods 70.

The connections between push rods 70, retaining plate 74, and extrusion ring 43 are shown in detail in FIGS. 8 and 9. The push rods are received in complimentary dimensioned vertical bores 76 which extend through top plate 22. These bores are of a diameter which obtains a snug fit with the push rods while still maintaining free movement. To prevent recovered meat from escaping through bores 76, O-ring type seals 77 are provided where the push rods 70 enter extrusion block 47.

The operation of the demeating apparatus 20 is illustrated by FIGS. 11–15, which show the apparatus in various portions of the demeating cycle. Referring to FIG. 11, hopper 13, loaded with bone fragments 49, is positioned by infeed cylinder 12 over piston 28. Initially, piston 28 and sleeve 37 are flush with infeed apron 10 so that the bone fragments remain in infeed hopper 13. Press cake 51, formed during the previous compression cycle, is pushed clear of sleeve 37 by push member 14 as infeed hopper 13 slides into position.

Figure 12:
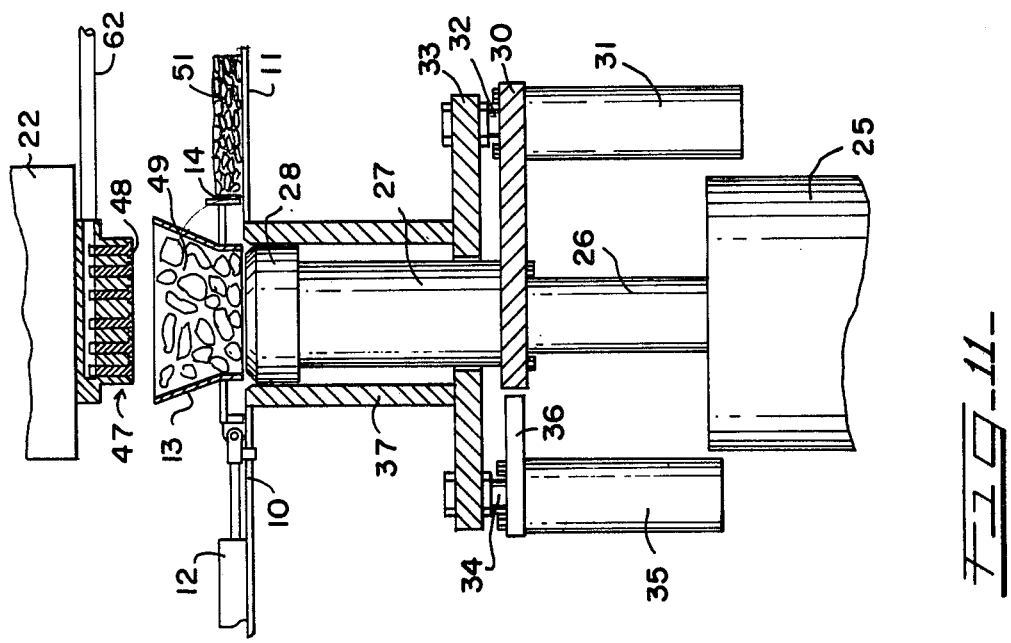
FIG. 12 is a front elevational view, partially in cross section, of the compression chamber and extrusion head in a second portion of the demeating cycle.

Referring to FIG. 12, the compression piston 28 is next retracted causing the bone fragments 49 in infeed hopper 13 to fall into the interior of sleeve 37. The infeed hopper 13 is then retracted from its position over piston 28 and sleeve 37 and may be reloaded in preparation for the next cycle. Prior to beginning the compression portion of the demeating cycle it is necessary to close the compression chamber, and this is accomplished as shown in FIG. 13 by actuating sleeve cylinders 35 so as to raise sleeve plate 33, and hence sleeve 37, into engagement with extrusion head 40. In this regard, it will be recalled that extrusion head 40 includes a downwardly depending portion 55 of reduced diameter which is snugly received in sealing engagement within cyindrical sleeve 37. The jack cylinders 31 remain de-energized at this time, and jack plate 30 and hence compression piston 28 are pulled up with sleeve plate 33.

Referring to FIG. 14, once the cylindrical sleeve 37 is in position the compression cycle begins. Initially, jack cylinders 31 are actuated to draw jack plate 30 up toward sleeve plate 33. This has the effect of accelerating the advance of compression piston 28, since the rate of advance available from the low-volume low-pressure jack cylinders 31 is substantially greater than that available from the high-volume high-pressure ram cylinder 25. Once the jack plate 30 has been raised to a position wherein the compression piston 28 engages the bone fragments 49, which are now compacted up against the foraminous surface 48 of the extrusion block 47, additional pressing effort is exerted by the hydraulic ram cylinder 25. This cylinder exerts a great force very slowly on the compressed bone fragments to accomplish the desired extrusion of meat material in fluid form with minimum abrasion or working of the bone fragments. The compression cycle continues for a predetermined period of time after a predetermined terminal pressing effort has been obtained by the hydraulic ram cylinder 25, at which time the pressing cycle is terminated.

Referring now to FIG. 15, following completion of the compression cycle ram cylinder 25 is de-energized and the sleeve cylinders 35 are retracted. This causes the cylindrical sleeve 37 and compression piston 28 to retract until the top margins of sleeve 37 are flush with infeed and outfeed aprons 10 and 11, respectively. At the same time the annular extrusion rings 41–43 are extended by actuation of cylinder 50, as previously described, to free the press cake 51 adhering to the foraminous surface 48 following completion of the compression cycle. During this portion of the operating cycle the jack cylinders 31 are further retracted to line up the top or pressing surface of the compression piston 28 with the top margins of the cylindrical sleeve 37 and the infeed and outfeed aprons 10 and 11. This positions the resulting press cake 51 of bone fragments in position to be pushed aside by the next operation of the hydraulic feed cylinder 12 (FIG. 11).

The aforedescribed sequence of operations is controlled by means of a plurality of limit switches arranged to be actuated as sleeve plate 33, jack plate 30 and the infeed hopper occupy predetermined positions within their respective ranges of movement. Referring to FIG. 1, limit switches for sensing the position of the jack plate and sleeve plate are mounted on a switch support bar 80 which is attached at its top and bottom ends to one of the support columns 23 of the machine frame by means of brackets 81. Jack plate 30 is provided with an actuator arm 82 for actuating certain of these switches and sleeve plate 33 is similarly provided with an actuator arm 83 for actuating certain ones of these limit switches. Limit switches provided on support bar 80 include a limit switch LS3 for sensing a full-up sleeve position, a limit switch LS4 for sensing a full-down sleeve position, a limit switch LS5 for sensing a ram full-down position, a limit switch LS6 for sensing a ram flush condition, and a limit switch LS7 for sensing the movement of piston 28 to a predetermined position wherein it begins to engage the bone fragments in the compression chamber. Limit switches associated with the operation of the infeed hopper 13 include a limit switch LS1 mounted adjacent the infeed apron for sensing the hopper being in position over sleeve 37, and a second limit switch LS2 for sensing the hopper being in its retracted position.

The electrical and hydraulic circuitry utilized in the demeating apparatus is shown in simplified form in the schematic diagrams of FIGS. 16 and 17, respectively. Referring to the electrical diagram in FIG. 16, the three phase AC line from which the apparatus operates is connected through contacts 107 and overload detectors OL1 to a hydraulic pump motor 100, which is utilized to power the hydraulic pumps utilized in the hydraulic system. Two legs of the AC line are connected through fuses 101 to a step-down transformer 102 which reduces the incoming AC line voltage to a low voltage suitable for use in the control circuitry of the apparatus. One side of the secondary winding of transformer 102 is grounded and the other end is connected to a low-voltage supply bus 92. This bus is connected through a normally-closed STOP push button switch 103, a normally-open START switch 104 and the normally-closed overload contacts 105 of overload relay OL1 to the coil of a control relay CRM, which controls the operation of the hydraulic motor. The other terminal of relay coil CRM, and the other terminal of the other relay coils and solenoids used in the control system are connected to ground.

START switch 104 is bypassed by a set of normally-open contacts 106 of relay CRM to obtain latching action for the stop-start circuit. When START switch 104 is momentarily depressed, control relay CRM is energized and contacts 106 and 107 close. This maintains relay CRM energized and motor 100 operative until STOP switch 103 is subsequently depressed.

Supply line 92 is also connected through normally-open START CYCLE push button switch 110, normally-open held-closed contacts on limit switch LS4 and LS6, and a set of normally-closed contacts 111 of a control relay CR6 to a control relay CR1, which is energized during operation of the demeating apparatus. START switch 110 and limit switches LS4 and LS6 are shunted by a set of normally-open contacts 112 of relay CR1 and contacts 111 of relay CR6 are shunted by normally-open push button switch contact 113 of START CYCLE switch 110. To initiate a demeating cycle switch 110 is momentarily actuated to energize control relay CR1, which is maintained energized by contacts 112.

For automatic operation an AUTO-SINGLE mode switch 114 is closed to establish another holding circuit for relay CR1 through a set of normally-open contacts 115 of a control relay CR2. Control relay CR2, which is energized to maintain the demeating cycle, is energized from line 92 by a circuit including an additional set of normally-open contacts 116 associated with START CYCLE switch 110, a set of normally-open contacts 117 associated with relay CR1, a set of normally-open contacts 118 of switch 114 (closed in AUTO operation), and a normally-closed STOP CYCLE push button switch 120. Switch 116 and relay CR1 contacts 117 are shunted by a set of holding contacts 121 associated with control relay CR2 so that once relay CR2 is actuated by momentarily closing START CYCLE switch 116 with AUTO-SINGLE switch 118 positioned for AUTO operation, control relay CR2 is actuated and contacts 115 are closed to maintain relay CR1 actuated and the demeating apparatus in operation.

The output of step-down transformer 102 is connected through a set of normally-open contacts 112 of control relay CR1 to a second low-voltage supply bus 123 from which the various individual circuits for controlling demeater apparatus 20 receive their operating power. Supply bus 123 is energized whenever control relay CR1 is energized, which is accomplished periodically by user actuation of START CYCLE switch 110 in the SINGLE mode, or continuously by relay CR2 in the AUTO mode. Control bus 123 is connected through normally-closed contacts 124 to a solenoid 125 which actuates pneumatic cylinder 12 to slide hopper 13 into position over sleeve 27. Contacts 124 are also connected through a set of normally-open contacts 126 of a control relay CR8, to a solenoid 127 which conditions the hydraulic system to lower jack plate 33. Supply bus 123 is connected through a set of normally-open contacts 128 of a control relay CR8, the normally-open contacts of limit switch LS5, and a set of normally-closed contacts 130 of a control relay CR6, to a control relay CR3, which is energized when the ram is fully down and the product transfer hopper is fully forward. Contacts 128 and LS5 are bypassed by a normally-open contact 131 of control relay CR3, and contacts 130 and relay CR3 are paralleled by the normally-open held-closed contacts of limit switch LS2 and a control relay CR4, which is energized during that portion of the cycle when the product transfer hopper 13 is returning following loading of the compression chamber. Supply bus 123 is also connected through the normally-open contacts of limit switch LS1 to control relay CR8, which is energized when infeed hopper 13 is positioned over sleeve 37 and piston 28.

Supply bus 123 is connected to a set of normally-open contacts 132 of control relay CR5 to a solenoid 133 which causes the hydraulic system to lower sleeve 37. Contacts 132 are bypassed by a set of normally-closed contacts 134 of control relay CR4. Supply bus 123 is also connected through a set of normally-open contacts 135 of relay CR4 and a set of normally-closed contacts 136 of relay CR5 to a solenoid 137 which conditions the hydraulic circuit to raise sleeve 37. A set of normally-open contacts on limit switch LS3 and a set of normally-closed contacts 138 of relay CR5 connect the supply bus 123 to a solenoid 140 which conditions the pneumatic system to retract the extrusion rings. Limit switch LS3 is bypassed by a set of normally-open contacts 141 of relay CR7, and contacts 138 and solenoid 140 are paralleled by a set of normally-closed contacts 142 of relay CR6 and a solenoid 143 which conditions the hydraulic circuit to raise jack plate 30 by actuation of cylinders 31.

Supply bus 123 is connected by a set of normally-closed contacts 144 of relay CR7 and a set of normally-open contacts 145 of relay CR5 to a solenoid 146 which conditions the hydraulic circuit to rapidly decompress the ram cylinder 125. Supply bus 123 is also connected by a normally-closed contact of limit switch LS4 and a set of normally-open held-closed contacts 147 of control relay CR5 to the solenoid of control relay CR7, which is energized whenever the pressing cycle has been completed and sleeve 37 is in its fully down position. A second set of normally-open contacts of limit switch LS3, a set of normally-open held-close contacts of limit switch LS7 and a set of normally-closed contacts 148 of relay CR5 supply current from bus 123 to a solenoid 150 which conditions the hydraulic system to close the prefill line to ram cylinder 25 prior to beginning the compression portion of the demeating cycle. A control relay CR5, which is energized after the pressure cycle has been completed, is energized from supply bus 123 by a series circuit consisting of the parallel combination of a set of normally-open contacts 151 of relay CR5 and a set of normally-open contacts 152 of a time delay relay TD2, and a set of normally closed contacts 153 of control relay CR6.

Supply bus 123 is also connected by a set of normally-open contacts 154 of a pressure switch PS1 to a time delay TD1 which controls the duration of the application of pressure of the bone fragment mass. Similarly, a set of normally-closed contacts 155 of pressure switch PS1 and a set of normally-open held-closed contacts of limit switch LS6 connect supply bus 123 to control relay CR6, which is energized following completion of the compression cycle after the ram has returned to its flush position.

The hydraulic and pneumatic circuitry utilized in the demeating apparatus of the present invention is illustrated in the simplified hydraulic diagram of FIG. 17. Referring to that Figure, motor 100 is seen to simultaneously drive a high-pressure low-capacity pump 160 and a low-pressure high-capacity pump 161. Pump 161 is connected through a pressure relief valve 162 to the hydraulic reservoir 163 and by a one-way check valve 164 to a hydraulic distribution manifold 165. Pump 160 feeds the distribution manifold 165 directly.

Distribution manifold 165 is connected by way of a four-port three-position hydraulic valve 166 to jack cylinders 31. Depending on the position of valve 166, hydraulic pressure is applied to either the bottom or top inlets of these jack cylinders to either raise or lower jack plate 30. When solenoid 127 is energized, the distribution line 165 is connected to the bottom inlets of cylinders 31 and the jack plate 30 is lowered, and when solenoid 143 is energized, distribution manifold 165 is connected to the top ports and the jack plate is raised. When neither solenoid is energized the valve ports are open to reservoir 163 and jack plate 30 remains stationary. A pressure relief valve 167 is provided to vent the ports of cylinders 31 to reservoir 163 in the event of excessive pressure.

The two sleeve cylinders 35 are similarly controlled by a four-port three-position hydraulic control valve 170 which is actuated by solenoids 133 and 137 to raise and lower sleeve plate 33. The effect of actuating solenoid 133 of this valve is to connect the distribution manifold 165 to the top ports of cylinders 35, which has the effect of retracting the piston rods 34 associated with these cylinders to lower sleeve plate 33. Conversely, the effect of energizing solenoid 137 is to connect the distribution manifold 165 to the bottom ports of cylinders 35, thereby raising piston rods 34 and sleeve plate 33. When neither solenoid is energized the distribution line is vented to reservoir 163, effectively removing pressure from the entire hydraulic system. A pressure relief valve 171 is provided to vent the top ports of cylinders 35 to reservoir 163 in the event of excessive pressure being developed therein.

The high-pressure high-volume ram cylinder 25 is supplied with hydraulic fluid during the initial or prepositioning portion of the compression cycle when hydraulic jack cylinders 31 raise the ram rapidly into contact with the bone fragments 49 by way of check valve 175, which is controlled by a two-port two-position hydraulic control valve 174. When the solenoid 150 associated with valve 174 is not energized pressure from manifold 165 is applied to check valve 175 so that valve 175 is free to open to supply hydraulic fluid to the bottom port of ram 25 from reservoir 163 as the jack cylinders 31 pre-position the ram. When solenoid 150 is actuated, valve 174 closes and prevents further passage of fluid through check valve 175. At this point the high pressure portion of the compression cycle is begun since pressure relief valve 176 allows pressure from manifold line 165 to enter the bottom port of ram cylinder 25. To terminate the pressing cycle the bottom port of ram cylinder 25 is also connected by an inline surge damping valve 177 and a relief valve 178 to reservoir 163. Valve 178 is controlled by a two-port two-position valve 180. When the solenoid 146 associated with valve 180 is actuated, valve 178 is opened to vent the input to cylinder 25.

To control the sequencing of the compression cycle a pressure switch PS1 is connected to manifold line 165 through a pressure relief valve 181, and vented to reservoir 163 through an orifice 182 and a one-way check valve 183. This switch is actuated when the pressure in line 165 exceeds a predetermined level, as determined by the setting of relief valve 181 and the size of orifice 182.

The pneumatic system consists of a regulated air source 190 which supplies air under pressure to the product transfer cylinder 12 by way of a four-port two-position control valve 172. When the solenoid 125 associated with that valve is not energized, pneumatic pressure is applied to the forward or front port of cylinder 12 so as to cause the piston rod associated with that cylinder to retract and draw the infeed hopper 13 away from the compression chamber. When solenoid 125 is actuated pneumatic pressure is instead applied to the rear port of piston 12. This causes the piston rod of cylinder 12 to extend and position hopper 13 over the center of sleeve 37 are required when loading bone fragments into the compression chamber.

The ring extension cylinder 50 is connected by a four-port two-position control valve 173 to air source 190. When the solenoid 140 associated with this valve is not energized, pneumatic pressure is applied to the top port of cylinder 50 so that piston rod 53 and extrusion rings 41–43 are extended to unlodge the press cake 51 from foraminous surface 48. However, when solenoid 140 is actuated, pressure is applied to the lower port instead causing the piston rod 53 to be retracted and the three extrusion rings 41–43 to be retracted into their respective annular channels in extrusion block 47. The rings are maintained in this position during the pressing cycle to provide the foraminous surface 48 through which the meat product recovered from the bone fragments is extruded.

In operation, the START CYCLE switch 110 is momentarily depressed. This closes contacts 122 and supplies oower to the control bus 123. Since contacts 124 of relay CR3 are closed at this time, solenoid 125 is actuated and the product transfer cylinder 12 is caused to move hopper 13, loaded with bone fragments 49, into position over sleeve 37 and piston 28. Once the transfer hopper reaches this position limit switch LS1 is actuated to energize relay CR8. This closes contacts 126 to energize solenoid 127, which conditions the hydraulic system to lower the jack plate 30. Relay CR6 is energized at this time by reason of the ram flush limit switch LS6 being closed and the hydraulic pressure in manifold line 165 not being yet sufficient to close pressure switch PS1. Solenoid 143 is de-energized by reason of contacts 142 of relay CR6 being open. As jack plate 30 is lowered piston 28 is lowered relative to sleeve 37 to form a chamber for receiving the bone fragments from hopper 13.

Eventually piston 28 reaches its full down position at which time limit switch LS5 is actuated. This causes control relays CR3 and CR4 to be actuated which in turn causes solenoid 127, heretofore energized to lower the jack plate, to become de-energized by reason of the opening of contacts 124. At the same time solenoid 125, heretofore energized to position hopper 13 for loading, is de-energized to return the hopper to its home position.

When the hopper 13 returns to its home position, limit switch LS2 opens, causing control relay CR4 to become de-energized. This in turn causes solenoid 133, heretofore energized through contacts 134, to bottom out or flush sleeve 37 relative to infeed apron 10, to become de-energized as contacts 134 open. Solenoid 137, however, is immediately energized by reason of contacts 135 closing. This causes the sleeve 37 to be raised into position against extrusion block 47 at which time limit switch LS3 is actuated closed.

Upon actuation of limit switch LS3 solenoid 140 is energized through contacts 138 to condition the pneumatic system to retract the extrusion rings. At the same time solenoid 143 is energized through contacts 142 to raise the jack plate 10. This has the effect of raising the compression piston 28 to a point of engagement with the bone fragments 49 and of simultaneously prefilling the ram cylinder 25 through check valve 175 to facilitate immediate commencement of the compression portion of the demeating cycle.

When piston 28 reaches a position adjacent the bone fragments 49 in the compression chamber, limit switch LS7 is actuated open. This causes solenoid 150, heretofore energized through contacts 148 and LS3 by reason of control relay CR5 being de-energized and sleeve 37 having reached its uppermost position and having closed limit switch LS3, to open. This closes the prefill line to ram cylinder 25, and since the decompression valve 178 in that line is closed by reason of solenoid 146 being de-energized, sequencing valve 176 opens and pressure in the cylinder increases.

The compression portion of the demeating cycle now begins. Initially, both of the hydraulic pumps 160 and 161 supply manifold 165 and ram cylinder 25 presses at a relatively low pressure during a first portion of the compression cycle. Eventually the pressure in manifold 165 rises to a level where relief valve 162 opens, typically in the order of 1800 psi, which vents pump 161 to reservoir 163 and causes check valve 164 to close. The pressure in line 165, and hence the compression effort exerted by ram cylinder 25, now increases at a slower rate as the single lower volume pump 160 continues to supply presuure to manifold line 165. Eventually the pressure in manifold line 165 rises to the predetermined level at which pressure switch PS1 is actuated, typically in the order of 5000 psi. The actuation of switch PS1 closes contacts 154 to energize time delay relay TD1 and opens contacts 155 to de-energize control relay CR6. The opening of relay CR6 causes contacts 142 to open and solenoid 143 to be de-energized, conditioning the hydraulic system to discontinue the application of hydraulic power to jacck cylinders 31 and to vent these cylinders to the reservoir 163. This also closes contacts 153 so that, after time delay relay TD1 becomes energized at the completion of a timed portion of the pressing cycle in which continuous pressure is applied to the bone fragments, contact 152 close and control relay CR5 is energized. The actuation of relay CR5 closed contacts 145 which actuates solenoid 146. This solenoid opens valve 180, which in turn opens valve 178 to vent hydraulic pressure from ram cylinder 25. The inline surge damping valve 177 provided in series with valve 178 lessens the shock to the hydraulic lines from the sudden release of pressure from ram 25. When the pressure in line 165 falls to a level where pressure switch PS1 is no longer actuated, contacts 155 close and relay CR6 is energized, which opens contacts 153 to de-energize relay CR5.

The actuation of relay CR5 also opens contacts 148 to de-energize solenoid 150, which conditions hydraulic vlave 174 to allow check valve 175 in the prefill line to ram cylinder 25 to open. At the same time contacts 138 open to remove power from solenoid 140, which conditions valve 173 to actuate the pneumatic ring extension cylinder 50 to extend the extrusion rings. The compression piston 28 and sleeve 37 are caused to retract at this time since the actuation of relay CR5 opens contacts 136, removing power from solenoid 137, and closed contacts 132, to actuate solenoid 133.

When sleeve 37 reaches its full down or flush position limit switch LS4 is actuated. This energized relay CR7, which results in solenoid 143 being energized through contacts 141 to condition valve 166 to retract the jack cylinders 31 and bring the compression piston 28 flush with the top of sleeve 37. Limit switch LS6 is actuated open when the compression piston 28 reaches a flush position with the top edge of the sleeve 37. This de-energizes relay CR6 which closes contacts 153 to energize relay CR5, which conditions the control circuitry for another demeating cycle.

It will be appreciated that the electrical and hydraulic diagrams illustrated in FIGS. 16 and 17 are simplified for the purpose of illustration, and that in practice additional circuitry may be added to control the speed and timing of various functions, and to permit operator control of certain individual functions.

While the demeating apparatus of the present invention can be constructed in various sizes and with various capacities, one specific example will be given as demonstrative of a proven application.

EXAMPLE

Four pounds of trimmed carcass bone having residual raw or undenatured meat thereon are first reduced to approximately three-eighths inch diameter by one inch long pieces or bone fragments in a conventional bone breaker. In this mass the larger bone fragments may measure approximately one and one-half inches long while the smaller fragments may measure only one-half inch long. The mass of broken bones is loaded into hopper 13 and from there dumped into the interior of sleeve 37. The sleeve 37 may have an inside diameter of seven and one-half inches and the depth from the top margins of the sleeve 37 to the top of the pistons 28 in its initial condition may be eight inches. After the sleeve has been raised into engagement with extrusion block 47, compression piston 28 is advanced to apply pressure to the bone fragments. Initially, at the beginning of the compression cycle, the hydraulic pressure in the system may approach 1700 psig until relief valve 162 opens, after which the system pressure may increase to 5000 spig. Initially, the piston is advanced by the jack cylinders at at rate of 23 inches per second, and after engaging the bone fragments will advance at a progressively decreasing rate.

Fluidized meat begins to extrude through the discharge connections after the piston has moved or advanced approximately three inches. After the compression cycle is completed, the press cake 51 of demeated bones has a depth of approximately one inch and weights approximately one and one-half pounds. Typically, one and one-half pounds of fluidized meat are removed from this bone mass during the pressing operation.

It will be appreciated that the compression chamber can be arranged either horizontally or vertically and with elements of other sizes and shapes. For instance, instead of a cylindrical sleeve 37, the press may be formed with a rectangular wall. However, the illustrated arrangement has proven imminently successful in providing an efficient high speed meat extrusion with a minimum of calcium content in the recovered meat.

It will also be appreciated that sleeve 37 can, if desired, be chambered or jacketed so that water or other liquid can be circulated therethrough for controlling, cooling or heating of the bone fragments contained within. Also, instead of hydraulic cylinders other types of power sources can be employed, such as jack screws or pneumatic cylinders. Also, instead of limit switches, other types of position detectors, such as photocells and magnetic switches can be employed to detect the position of compression piston 28 and the other elements of the demeating apparatus.

An alternate, somewhat simpler construction for the compression chamber of the demeating apparatus is shown in FIGS. 18-23. Referring to FIGS. 18-21, the compression chamber in the alternate embodiment is formed by a cylindrical sleeve 205 equipped with a ram or piston 206 having one or more O-ring seals 207. A piston rod or connecting rod 208 projects from the piston rod 206 and this may be actuated or driven in any suitable means such as by a hydraulic power cylinder or mechanically by a motorized screw, as will be well understood by those skilled in the art.

The open end of the cylinder 205 opposite the piston 206 after being loaded is closed by an extrusion block 210 which may have an exteriorly threaded cylindrical plug portion 211 adapted to screw into the internally threaded end of the cylinder 205. The sealing action of the threads is improved by providing an O-ring seal 209 on the plug portion 211. It will be understood that other means may be used for securely fastening the extruder block on or into the piston 205 such as quick-acting external clamps of known type.

Figure 22:
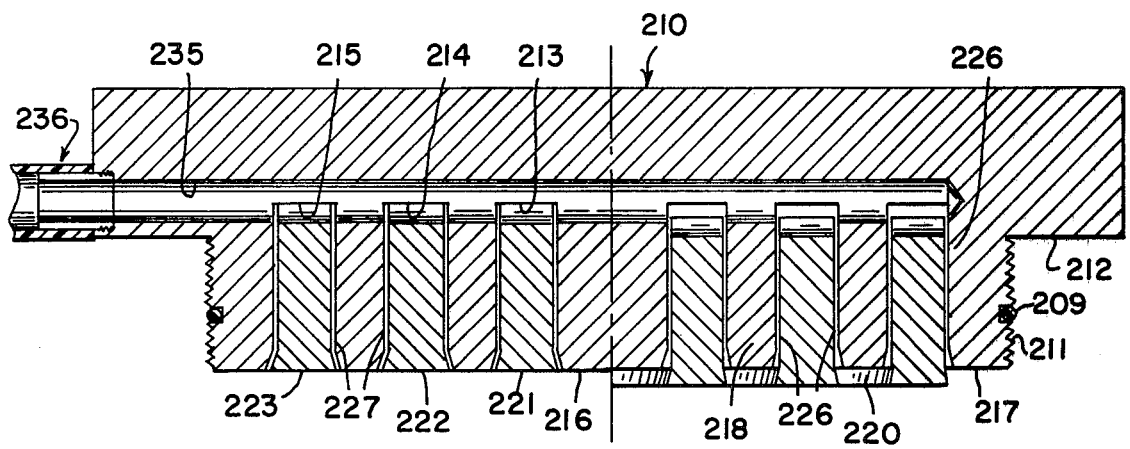
FIG. 22 is an enlarged diametric sectional view of the extrusion head utilized in the compression chamber of FIGS. 18–21.
Figure 23:
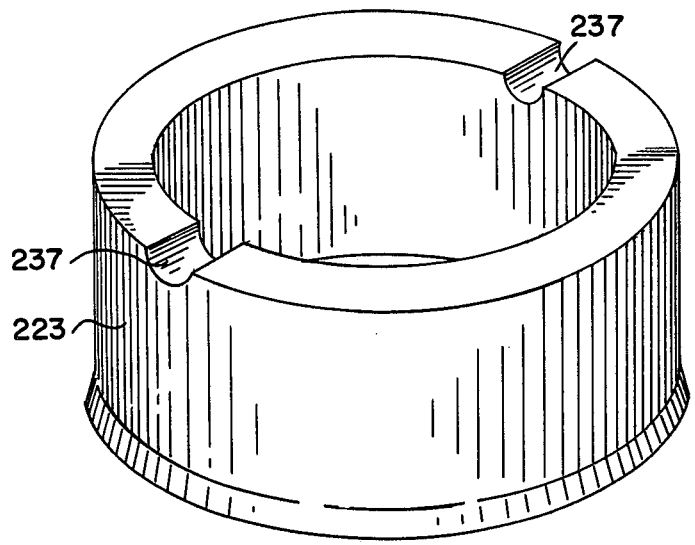
FIG. 23 is a perspective view of one of the annular extrusion rings of the extrusion block of FIG. 22.

Referring to FIGS. 22 and 23, the extruder block 210 includes a base portion 212 in addition to the threaded plug portion 211. A plurality of concentric annular recesses 213, 214 and 215 are formed in the plug portion 211 leaving a center core 216, an outer ring or cylindrical wall 217, and intermediate cylindrical rings or partitions 218 and 220. The annular recesses 213, 214 and 215 are provided with separate interfitting rings 221, 222, and 223, respectively, ring 223 being shown in perspective in FIG. 23.

It will be seen that each ring 221, 222 and 223 is provided with a short outwardly flared or beveled outer end portion matingly received with small clearance on opposite sides in correspondingly outwardly flared or beveled entrances into the annular recesses or wells 213, 214 and 215, respectively. The width of each ring 221, 222 and 223 for the most of the axial length thereof is slightly less than the width of its corresponding annular recess 213, 214 and 215, respectively so as to provide a small clearance on each side of the rings 221, 222 and 223 as indicated at 226—226. The side clearances 226 will be appreciably greater than the clearances between the outwardly flared outer ends of the rings and the outwardly flared entrances into the recesses. For example, the side clearances 226 may be in the order of 0.0625 inch while clearances 227—227 in the flared areas may be in the order of 0.015 inch.

It will be seen that the extrusion block 210 provides a foraminous end wall in which the foramina are in the form of the narrow annular clearances 227—227.

At least one fluidized meat discharge or outlet passageway 235 is formed as by drilling in the extruder block base portion 212 so as to communicate with the inner end of each of the annular recesses 213, 214 and 215 and allow for the discharge of fluidized meat squeezed through the clearances between the mating surfaces of the rings 216, 222 and 223 and the annular recesses 213, 214 and 215, respectively. If desired, more than one passageway 235 may be provided and each will be provided at its outer end with a suitable discharge conduit 236. Each ring 221, 222 and 223 has diametric grooves 237—237 in the inner end which may be formed during the drilling of outlet bore 235.

Referring again to FIGS. 18-21, after the empty cylinder 205 with the retracted piston 206 has been filled with a mass of broken trimmed bones as indicated diagrammatically in FIG. 18, the extruder block 210 is turned in place and pressure is exerted on the piston 206 through the connecting rod 208. It will be apparent that the mass of bones within the cylinder 205 will be compressed toward the extrusion block 210.

As the piston 206 advances toward the extrusion block 210, the mass of bone fragments and pieces becomes increasingly compressed together and the residual meat attached to the bone pieces or particles or fragments to an increasing extent takes a fluidized form and discharges through the small annular clearances or foramina 227—227 provided by the extrusion block 210. These clearances are sufficiently small to prevent entrance of bone particles. Some size reduction and crushing action may occur as the mass of fragments and pieces of bone is compressed within the cylinder 205. The reduction in the volume of the mass is the result of several factors including the removal of the adherent or residual meat from the bone fragments, the compaction of the bone pieces or fragments into a mass with less space therebetween and in part to any crushing that may take place. In the early stages of the compression action the piston 206 advances relatively rapidly and the hydrostatic pressure within the cylinder 205 will be relatively low. However, as the piston face approaches the foraminous surface provided by the inner face of the extrusion block 210 the movement of the piston is increasingly retarded and the hydrostatic pressure rises rapidly. Typically, the reduction in the volume of the mass of broken bones is in the order of 80% based on the original volume with the final compaction being illustrated in FIG. 20. At approximately this point the advancing force on the piston 206 is discontinued and then the piston may be slightly backed off to facilitate the opening of the cylinder 205 and removal of the extrusion block 210. After the extrusion block 210 has been removed, the piston 206 is again advanced so that its face is even with the end of the cylinder 205 whereupon the compacted mass of bones may be scraped off by a manual or machine operated scraper as indicated at 240.

While particular embodiments of the invention have been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A method for removing and recovering meat from a mass of bone fragments comprising the steps of:
   compressing said mass in means providing a chamber to form a press cake of substantially reduced volume;
   collecting the meat which extrudes from the mass during said compression through an extrusion head having an extrusion block including at least one recess for passing extruded meat from said chamber, and at least one extrusion member interspaced therein; and extendable from and retractable in said recess, said extrusion block and said extrusion member together forming a foraminous surface in said chamber;

extending each said extrusion member from said recess to release residual solid matter retained within the foramina of said foraminous surface; and removing said press cake from said chamber.

2. A method for removing and recovering meat from bone fragments as defined in claim 1 wherein said extrusion member is when required at least partially removed from said recess for cleaning following removal of said press cake.

3. A method for removing and recovering meat as defined in claim 1 wherein said extrusion member is positioned within said recess by means of push rods, and extended from said recess following compression of said mass by actuating said push rods.

4. A method for removing and recovering meat as defined in claim 2 wherein said extrusion head includes a plurality of said recesses each having an extrusion member interspaced therein, and wherein said extrusion members are simultaneously extended to remove residual solid matter from said foraminous.

5. A method of removing and recovering meat from bone fragments comprising the steps of:

compacting a mass of bone fragments into a dense press cake against a rigid foraminous wall while meat removed from said bone fragments during compaction extrudes through the foramina in said wall;

temporarily enlarging the foramina in said wall after a dense press cake of bone fragments has been formed thereon; and removing said press cake from said wall along with residual solid matter retained in said foramina.

* * * * *

UNITED STATES PATENT AND TRADEMARK OFFICE
CERTIFICATE OF CORRECTION

PATENT NO. : 4,094,042

DATED : June 13, 1978

INVENTOR(S) : Roy Settle Rousseau

It is certified that error appears in the above-identified patent and that said Letters Patent are hereby corrected as shown below:

Column 4, immediately following line 2, the language contained in the attached pages should be inserted thereat.

On the title page, item [62], "Ser. No. 505,977" should read --502,977--.

In the Abstract, line 9, "fragements" should read --fragments--.

Column 8, line 68, "terminal" should read --terminals--.

Column 9, line 19, "contact" should read --contacts--.

Column 12, line 11, "are" should read --as--.

Column 13, line 39, "jacck" should read --jack--;
line 44, "contact" should read --contacts--;
line 45, "closed" should read --closes--;
line 65, "closed" should read --closes;
line 68, "energized" should read --energizes--.

Column 14, line 33, "pistons" should read --piston--
line 42, "at" (2nd occ.) should read --a--.
line 50, "weights" should read --weighs--.

Column 16, line 58, after "of" insert --a--.

Signed and Sealed this

Thirtieth Day of October 1979

[SEAL]

Attest:

RUTH C. MASON
Attesting Officer

LUTRELLE F. PARKER
Acting Commissioner of Patents and Trademarks

Description of the Preferred Embodiment

Referring to Figures 1-3, the demeating apparatus 20 includes a supporting framework comprising a base plate 21, a top plate 22 and four corner posts 23. The top plate 22 is mounted on the upper ends of support posts 23 and is secured thereto by fastening means in the form of cap screws 24. The other ends of the four corner posts 23 are attached to the bottom plate 21 so as to maintain the posts in a parallel-upstanding relationship.

To provide the large compression effort required to adequately compress bone fragments the demeating apparatus 20 is provided with a hydraulic ram cylinder 25. This ram cylinder is mounted on the top surface of base plate 21 between the four column supports 23 and includes a piston shaft 26 which moves vertically on the application of hydraulic power to the cylinder. The free end of piston rod 26 is attached to a larger diameter piston rod 27 which connects to a compression piston 28 provided for compressing bone fragments during each demeating cycle.

Also attached to and carried by the piston rod 26 of ram cylinder 25 is a jack plate 30. This jack plate carries two downwardly depending relatively low-volume low-pressure hydraulic jack cylinders 31 (one cylinder not shown in Figure 1) which are provided for rapidly positioning the otherwise slowly moving piston rod 26 of the relatively high-volume high-pressure ram cylinder 25. The piston rods 32 of jack cylinders 31 extend upwardly through jack plate 30 and into engagement with a horizontal sleeve plate 33. Sleeve plate 33 is also attached to the piston rods 34 of a pair of hydraulic sleeve control cylinders 35 (one cylinder not shown in Figure 1) which are provided for raising and lowering sleeve plate 33. Sleeve cylinders 35 are supported on opposite sides of the apparatus by means of brackets 36 which are mounted on adjacent ones of support posts 23. By actuating hydraulic cylinders 35 it is possible to move sleeve plate 33 vertically within a defined range of movement relative to the framework of the apparatus, and by actuating jack cylinder 31 it is possible to move jack plate 30 within a defined range of movement relative to sleeve plate 33. The manner in which this vertical movement of jack plate 30 and sleeve plate 33 is utilized in compressing bone fragments will be covered in detail presently.

As mentioned previously, in performing the demeating operation it is necessary that the bone fragments with meat attached be placed in a chamber in which compression can take place. In demeater 20 the side walls of this compression chamber are formed by a cylindrical sleeve 37 attached at its bottom end to sleeve plate 33. Sleeve 37 is positioned on sleeve plate 33 so as to be coaxial with piston rod 27, and is dimensioned to slidably receive the compression piston 28. Sleeve 37 is attached to sleeve plate 33 by means of a clamp ring 38 which consists of two semi-circular pieces which interlock with sleeve 37 and are then bolted to sleeve plate 33. The interior dimensions of sleeve 37 are such that piston 28 is snugly but slidably received within the sleeve.